(12) United States Patent
Spence et al.

(10) Patent No.: US 11,322,905 B2
(45) Date of Patent: May 3, 2022

(54) SINGLE LONGITUDINAL MODE RING RAMAN LASER

(71) Applicant: Macquarie University, North Ryde (AU)

(72) Inventors: David James Spence, Forestville (AU); Ondrej Kitzler, Eastwood (AU); Jipeng Lin, Glasgow (GB); Richard Paul Mildren, Abbotsford (AU); Helen M. Pask, Seaforth (AU); Graeme P. A. Malcolm, Ochtertyre (GB); Nils Hempler, Balfron (GB); Stephen Webster, Glasgow (GB)

(73) Assignee: Macquarie University, North Ryde (AU)

( * ) Notice: Subject to any disclaimer, the term of this patent is extended or adjusted under 35 U.S.C. 154(b) by 81 days.

(21) Appl. No.: 16/475,747

(22) PCT Filed: Dec. 22, 2017

(86) PCT No.: PCT/AU2017/051452
§ 371 (c)(1),
(2) Date: Jul. 3, 2019

(87) PCT Pub. No.: WO2018/126293
PCT Pub. Date: Jul. 12, 2018

(65) Prior Publication Data
US 2021/0075182 A1    Mar. 11, 2021

(30) Foreign Application Priority Data
Jan. 6, 2017 (AU) .................................. 2017900027

(51) Int. Cl.
*H01S 3/08* (2006.01)
*H01S 3/081* (2006.01)
(Continued)

(52) U.S. Cl.
CPC .......... *H01S 3/08031* (2013.01); *H01S 3/083* (2013.01); *H01S 3/0816* (2013.01); *H01S 3/1394* (2013.01); *H01S 3/30* (2013.01)

(58) Field of Classification Search
CPC ......... H01S 3/30; H01S 3/083; H01S 3/08031
See application file for complete search history.

(56) References Cited

U.S. PATENT DOCUMENTS

2005/0163187 A1* 7/2005 Spinelli ................... H01S 3/083
372/94
2012/0263196 A1 10/2012 Pask et al.
(Continued)

FOREIGN PATENT DOCUMENTS

CN     104600552 A    5/2015
JP     2013-520804 A  6/2013
(Continued)

OTHER PUBLICATIONS

Granados et. al. "Deep ultraviolet diamond Raman laser", May 23, 2011 / vol. 19, No. 11 / Optics Express pp. 10857-10863. (Year: 2011).*

(Continued)

*Primary Examiner* — Xinning(Tom) Niu
*Assistant Examiner* — Delma R Fordé
(74) *Attorney, Agent, or Firm* — Wolf, Greenfield & Sacks, P.C.

(57) ABSTRACT

A single longitudinal mode ring Raman laser including: a pump source outputting a pump light power, resonantly coupled to a first ring resonator; a optical measurement and piezo-actuator for stabilising the resonant coupling of the pump light power to a first ring resonator; a first ring resonator including a Raman gain medium, wherein the Raman gain medium receives the pump light power and undergoes Raman lasing generating resonated Stokes power (Continued)

at the corresponding Stokes output wavelength; the first ring resonator acting as a feedback loop for the pump light power and the resonated Stokes power and outputting a portion of the Stokes power as the laser output.

8 Claims, 7 Drawing Sheets

(51) Int. Cl.
    *H01S 3/083*     (2006.01)
    *H01S 3/139*     (2006.01)
    *H01S 3/30*     (2006.01)

(56) References Cited

U.S. PATENT DOCUMENTS

2014/0092929 A1* 4/2014 Alpert .................. H01S 3/0604
                                                     372/38.04
2015/0261020 A1* 9/2015 Ju ........................ G02F 1/0036
                                                     385/11

FOREIGN PATENT DOCUMENTS

| WO | WO 2009/079730 A2 | 7/2009 |
| WO | WO 2011/103630 | 9/2011 |
| WO | WO 2015/077823 | 6/2015 |
| WO | WO 2018/126293 | 7/2018 |

OTHER PUBLICATIONS

International Search Report and Written Opinion dated Mar. 21, 2018 in connection with International Application No. PCT/AU2017/051452.
International Preliminary Report on Patentability dated Jul. 18, 2019 in connection with International Application No. PCT/AU2017/051452.
Bienfang et al., Steady-state thermo-optic model of a continuous-wave Raman laser. Journal of the Optical Society of America B. Jun. 2002; 19(6):1318-1325.
Bonner et al., Spectral broadening in continuous-wave intracavity Raman lasers. Optics Express. Apr. 7, 2014; 22(7):7492-7502.
Boyd et al., Optimization of the stimulated Raman scattering threshold. IEEE Journal of Quantum Electronics. Apr. 1969; .QE-5(4):203-206.
Brasseur et al., Continuous-wave Raman laser in H2. Optics Letters. Mar. 1, 1998; 23(5):367-369.
Brasseur et al., High-power deuterium Raman laser at 632 nm. Applied Optics. Feb. 10, 2004; 43(5): 1162-1166.
Couny et al., Subwatt threshold cw Raman Fiber-Gas laser based on H2-filled hollow-core photonic crystal fiber. Physical Review Letters. Oct. 5, 2007; 99:143903.
Dashkevich et al., Ring solid-state Raman laser at 1538 nm. Laser Physics Letters. 2011; 8(9):661-667.
Demtroder, Laser Spectroscopy: Basic Concepts and Instrumentation, 3rd ed. (Springer, 2003).
Ebrahim-Zadeh, Continuous-wave optical parametric oscillators. Handbook of Optics. 2010; 4: 34 pages.
Fan et al., High-efficiency continuous-wave Raman conversion with a BaW0$_4$ Raman crystal. Optics Letters. Jun. 1, 2009; 34(11):1687-1689.
Faxvog, Modes of a unidirectional ring laser. Optics Letters. Jul. 1980; 5(7): 285-287.
Grabtchikov et al., Multimode pumped continuous-wave solid-state Raman laser. Optics Letters. Nov. 1, 2004; 29(21): 2524-2526.
Green et al., Continuous-wave high-power rotational Raman generation in molecular deuterium. Optics Letters. Sep. 1, 2009; 34(17): 2563-2565.
Hansch et al., Cooling of gases by laser radiation. Optics Communications. Jan. 1975; 13(1): 68-69.
Hansch et al., Laser frequency stabilization by polarization spectroscopy of a reflecting reference cavity. Optics Communications. Dec. 1980; 35(3):441-444.
Karalekas et al., Impact of nonlinear spectral broadening in ultra-long Raman fibre lasers. Optics Express. Dec. 10, 2007; 15(25):16690-16695.
Kitzler et al, Continuous-wave wavelength conversion for high-power applications using an external cavity diamond Raman laser. Optics Letters. Jul. 15, 2012; 37(14): 2790-2792.
Kitzler et al., Single-longitudinal-mode ring diamond Raman laser. Optics Letters. Apr. 1, 2017; 42(7): 1229-1232.
Kozlovsky et al., Second-harmonic generation of a continuous-wave diode-pumped Nd:YAG laser using an externally resonant cavity. Optics Letters. Dec. 1987; 12(12):1014-1016.
Lee et al., Cryogenically monolithic self-Raman lasers: observation of single-longitudinal-mode operation. Optics Letters. May 1, 2015; 40(9):1996-1999.
Lux et al., Exploiting spatial-hole-burning-free Raman gain to realize high-power single-longitudinal mode oscillators. Advanced Solid State Lasers Conference. 2015; 3 pages.
Lux et al., Intrinsically stable high-power single longitudinal mode laser using spatial hole burning free gain. Optica. Aug. 2016; 3(8): 876-881.
Lux et al., Single longitudinal mode diamond Raman laser in the eye-safe spectral region for water vapor detection. Optics Express. Nov. 28, 2016; 24(24): 27812-27820.
Meng et al., Continuous-wave rotational Raman laser in H$_2$. Optics Letters. Jul. 15, 2002; 27(14):1226-1228.
Nabors et al., Efficient, single-axial-mode operation of a monolithic MgO:LiNbO$_3$ optical parametric oscillator. Optics Letters. Oct. 15, 1989; 14(20):1134-1136.
Orlovich et al., Continuous-wave intracavity Raman generation in PbWO$_4$ crystal in the Nd:YVO$_4$ laser. Laser Physics Letters. 2006; 3(2):71-74.
Pask, Continuous-wave, all-solid-state, intracavity Raman laser. Optics Letters. Sep. 15, 2005; 30(18): 2454-2456.
Repasky et al., Performance and design of an off-resonant continuous-wave Raman laser. Journal of the Optical Society of America B. Jun. 1998; 15(6):1667-1673.
Rong et al., A continuous-wave Raman silicon laser. Nature. Feb. 17, 2005; 433:725-728.
Sabella et al., 1240 nm diamond Raman laser operating near the quantum limit. Optics Letters. Dec. 1, 2010; 35(23):3874-3876.
Siegman, *Lasers* (University Science Books, 1986).
Tidemand-Lichtenberg et al., Unidirectional ring-laser operation using sum-frequency mixing. Optics Letters. Aug. 1, 2010; 35(15): 2567-2569.
Extended European Search Report for European Application No. EP 17890672.3 dated Jul. 16, 2020.
Japanese Office Action dated Nov. 9, 2021 in connection with Japanese Application No. 2019-536915, and English translation thereof.

\* cited by examiner

Fig. 1

Fig. 2. Combined output power and conversion efficiency of free running DRL.

FIG. 3

Fig. 4. Fabry-Perot scan over several free spectral ranges shows the DRL transit from single mode to multi mode operation.

Fig. 5. Unidirectional output power and efficiency of the DRL using a partially reflecting mirror and sum frequency mixing in BBO.

Fig. 6. Temporal behaviour of an unidirectional DRL using a feedback mirror. Inset shows single mode operation over tens of free-spectral-ranges of a scanning Fabry-Perot.

Fig. 7

SINGLE LONGITUDINAL MODE RING RAMAN LASER

RELATED APPLICATIONS

This application is a national stage filing under 35 U.S.C. § 371 of International Patent Application No. PCT/AU2017/051452, filed Dec. 22, 2017, which claims the benefit of Australian Application Number AU 2017900027, filed Jan. 6, 2017, each of which is incorporated herein by reference in its entirety.

FIELD OF THE INVENTION

The present invention relates to ring Raman laser structures, and, in particular discloses a single longitudinal mode ring Raman laser.

REFERENCES

1. W. Demtroder, Laser Spectroscopy: Basic Concepts and Instrumentation, 3rd ed. (Springer, 2003).
2. T. Hansch and A. Schawlow, "Cooling of gases by laser radiation," Optics Communications 13, 68-69 (1975).
3. M. Ebrahim-Zadeh, "Continuous-wave optical parametric oscillators," Handbook of Optics 4 (2010).
4. W. J. Kozlovsky, C. D. Nabors, and R. L. Byer, "Second-harmonic generation of a continuous-wave diode-pumped Nd:YAG laser using an externally resonant cavity," Optics Letters 12, 1014-1016 (1987).
5. C. D. Nabors, R. C. Eckardt, W. J. Kozlovsky, and R. L. Byer, "Efficient, single-axial-mode operation of a monolithic mgo:linbo3 optical parametric oscillator," Optics Letters 14, 1134-1136 (1989).
6. V. Karalekas, J. D. A.-C. nón, P. Harper, S. A. Babin, E. V. Podivilov, and S. K. Turitsyn, "Impact of nonlinear spectral broadening in ultra-long Raman fibre lasers," Opt. Express 15, 16690-16695 (2007).
7. E Couny, E Benabid, and P. S. Light, "Subwatt threshold cw raman fiber—gas laser based on $h_2$-filled hollow-core photonic crystal fiber," Phys. Rev. Lett. 99, 143903 (2007).
8. H. M. Pask, "Continuous-wave, all-solid-state, intracavity Raman laser," Optics Letters 30, 2454-2456 (2005).
9. K. S. Repasky, J. K. Brasseur, L. Meng, and J. L. Carlsten, "Performance and design of an off-resonant continuous-wave Raman laser," Journal of the Optical Society of America B 15, 1667-1673 (1998).
10. L. Fan, Y. X. Fan, Y. Q. Li, H. Zhang, Q. Wang, J. Wang, and H. T. Wang, "High-efficiency continuous-wave Raman conversion with a $BaWO_4$ Raman crystal," Optics Letters 34,1687-1689 (2009).
11. V. A. Orlovich, V. N. Burakevich, A. S. Grabtchikov, V. A. Lisinetskii, A. A. Demidovich, H. J. Eichler, and P. Y. Turpin, "Continuous-wave intracavity Raman generation in $PbWO_4$ crystal in the $Nd:YVO_4$ laser," Laser Physics Letters 3, 71-74 (2005).
12. C. Y. Lee, C. C. Chang, P. H. Tuan, C. Y. Cho, K. E Huang, and Y. E Chen, "Cryogenically monolithic self-raman lasers: observation of single-longitudinal-mode operation," Opt. Lett. 40, 1996-1999 (2015).
13. G. M. Bonner, J. Lin, A. J. Kemp, J. Wang, H. Zhang, D. J. Spence, and H. M. Pask, "Spectral broadening in continuous-wave intracavity raman lasers," Optics Express 22,7492-7502 (2014).
14. A. S. Grabtchikov, V. A. Lisinetskii, V. A. Orlovich, M. Schmitt, R. Maksimenka, and W. Kiefer, "Multimode pumped continuous-wave solid-state Raman laser," Optics Letters 29, 2524-2526 (2004).
15. O. Kitzler, A. McKay, and R. P. Mildren, "Continuous-wave wavelength conversion for high-power applications using an external cavity diamond Raman laser," Optics Letters 37, 2790-2792 (2012).
16. O. Lux, S. Sarang, O. Kitzler, and R. P. Mildren, "Exploiting spatial-hole-burning-free raman gain to realize high-power single-longitudinal mode oscillators," Advanced Solid State Lasers p. ATh3A.2 (2015).
17. O. Lux, S. Sarang, O. Kitzler, D. J. Spence, and R. P. Mildren, "Intrinsically stable high-power single longitudinal mode laser using spatial hole burning free gain," Optica 3, 876-881 (2016).
18. J. K. Brasseur, K. S. Repasky, and J. L. Carlsten, "Continuous-wave raman laser in $H_2$," Optics Letters 23, 367-369 (1998).
19. J. K. Brasseur, R. F. Teehan, P. A. Roos, B. Soucy, D. K. Neumann, and J. L. Carlsten, "High-power deuterium Raman laser at 632 nm," Applied Optics 43, 1162-1166 (2004).
20. J. T. Green, D. E. Sikes, and D. D. Yavuz, "Continuous-wave high-power rotational Raman generation in molecular deuterium," Optics Express 34, 2563-2565 (2009).
21. H. Rong, R. Jones, A. Liu, O. Cohen, D. Hak, A. Fang, and M. Paniccia, "A continuous-wave Raman silicon laser," Nature 433, 725-728 (2005).
22. T. Hansch and B. Couillaud, "Laser frequency stabilization by polarization spectroscopy of a reflecting reference cavity," Optics Communications 35, 441-444 (1980).
23. A. Sabella, J. A. Piper, and R. P. Mildren, "1240 nm diamond Raman laser operating near the quantum limit," Optics Letters 35, 3874-3876 (2010).
24. F. R. Faxvog, "Modes of a unidirectional ring laser," Optics Letters 5, 285-287 (1980).
25. A. E. Siegman, *Lasers* (University Science Books, 1986).
26. P. Tidemand-Lichtenberg, H. P. H. Cheng, and C. Pedersen, "Unidirectional ring-laser operation using sum-frequency mixing," Opt. Lett. 35, 2567-2569 (2010).
27. Boyd, G., W. Johnston, and I. Kaminow, Optimization of the stimulated Raman scattering threshold. Quantum Electronics, IEEE Journal of, 1969. 5(4): p. 203-206.
28. Dashkevich, V. I. and V. A. Orlovich, Ring solid-state Raman laser at 1538 nm. Laser Physics Letters, 2011. 8(9): p. 661.
29. Bienfang, J. C., et al., Steady-state thermo-optic model of a continuous-wave Raman laser. Journal of the Optical Society of America B-Optical Physics, 2002. 19(6): p. 1318-1325.
30. Meng, L. S., P. A. Roos, and J. L. Carlsten, Continuous-wave rotational Raman laser in H 2. Optics letters, 2002. 27(14): p. 1226-1228.

BACKGROUND OF THE INVENTION

Any discussion of the background art throughout the specification should in no way be considered as an admission that such art is widely known or forms part of common general knowledge in the field.

Continuous-wave (cw) single-longitudinal-mode (SLM) lasers are an important tool for applications exploiting light-matter interactions. For example, tunable SLM lasers are required for absorption spectroscopy to resolve narrow absorption features of fluids [1] and for atom cooling [2]. However, mature laser technologies using inversion gain media cover only a limited part of the optical spectrum. Therefore, nonlinear frequency conversion is necessary to reach wavelengths outside this range.

Nonlinear conversion of cw lasers is challenging due to the low peak power of the radiation. The lasing threshold of converters utilizing second-order nonlinearity, such as optical parametric oscillators, is often reduced by resonating two or all three interacting waves [3]. Pump power enhancement in an external high finesse resonant cavity was successfully applied to second-order harmonic conversion [4] and parametric generation [5]

In Raman lasers, which use a third-order nonlinear conversion process, low-to-moderate thresholds can be obtained in Raman fibre lasers and gas filled hollow core fibres due to the long interaction length, [6] and [7], respectively, or in intracavity or pump-enhanced resonators [8, 9]. Most work on cw crystalline Raman lasers used the Raman media inside the cavity of a conventional solid-state laser (see for example [8, 10, 11]).

SLM operation can be achieved by narrowing the pump and Raman gain line-widths under cryogenic cooling [12], or by inserting etalons or birefringent filters in the resonator [13]. External cavity configurations have also been explored [14], however, only synthetic diamond is able to efficiently convert substantial powers [15]. In diamond, SLM operation was observed up to 3.5 W of output power [16] and higher powers are expected for actively stabilized cavity arrangements [17].

Resonant enhancement of the pump laser in an external Raman cavity has to date been limited mainly to gas Raman lasers, using $H_2$ and $D_2$ [9, 18, 19]. SLM output was ensured by using a cavity with a free spectral range (FSR) of 2 GHz, larger than the Raman gain line-width (0.5-1 GHz). The highest output power reported was 300 mW using deuterium [20]. The performance of gas systems is limited mainly by thermal effects [19].

Weak resonant-enhancement was also used in the first cw SLM silicon Raman laser [21]. The simultaneous use of a waveguide to confine pump and Stokes fields over long interaction lengths, reverse bias across the structure to mitigate two-photon absorption due to free carriers, and resonant enhancement of the pump by a factor of 2, reduced the pump threshold to below 200 mW [21].

SUMMARY OF THE INVENTION

It is an object of the invention, in its preferred form to provide an improved Raman laser.

In accordance with a first aspect of the present invention, there is provided a single longitudinal mode ring Raman laser including: a pump source outputting a pump light power, resonantly coupled to a first ring resonator; a optical measurement and piezo-actuator for stabilising the resonant coupling of the pump light power to a first ring resonator; a first ring resonator including a Raman gain medium, wherein the Raman gain medium receives the pump light power and undergoes Raman lasing generating resonated Stokes power at the corresponding Stokes output wavelength; the first ring resonator acting as a feedback loop for the pump light power and the resonated Stokes power and outputting a portion of the Stokes power as the laser output.

The laser can further include a unidirectional isolator for causing the Stokes power to propagate in one direction within the first ring resonator. The unidirectional isolator can comprise one of a partially reflective mirror, a BBO crystal, or a non-reciprocal Faraday isolator.

The first ring resonator can comprise a Bow-tie cavity having a series of curved mirrors focusing the pump light power into an elliptical or circular cross section within the Raman lasing medium. The Raman gain medium can comprise a low birefringence, low nitrogen grown diamond crystal. The diamond crystal can be cut at a Brewsters angle for propagation of light along a [110] direction and polarization along a [111] axis.

The system can preferably include a series of dichroic mirrors having high selectivity at the Stokes wavelength to isolate the Stokes output power from the pump source.

In some embodiments, the partially reflective mirror can comprise a retro-reflective mirror. In some embodiments, the unidirectional isolator comprises a non reciprocal optical isolator. The unidirectional isolator can be created as a result of parametric loss due to sum frequency mixing of the pump light power with a bidirectional generated Stokes power. The pump light power can be sum frequency mixed with the Stokes power of the Raman lasing. The sum frequency mixing can be provided by a BBO crystal.

In accordance with a further aspect of the present invention, there is provided a single longitudinal mode ring Raman laser including: a pump power input unit for inputting Raman pumping power into a first ring resonator; a first ring resonator receiving said Raman pumping power and including a Raman gain medium for undergoing Raman lasing generating Stokes power at a corresponding Stokes wavelength; the first ring resonator acting as laser feedback loop for the Stokes power and outputting a portion of the Stokes power as the laser output; and a unidirectional isolator for causing the Stokes power to propagate in one direction within the first ring resonator.

In some embodiments, the unidirectional isolator can comprise one of a partially reflective element or a Barium Borate (BBO) crystal.

In accordance with a further aspect of the present invention, there is provided a Raman laser including: a pump power input unit for inputting Raman pumping energy to a Raman gain medium; a Raman gain medium for undergoing Raman lasing within a cavity at a corresponding Stokes output power; wherein the Raman gain medium comprises substantially diamond and wherein said cavity is cavity locked.

In accordance with a further aspect of the present invention, there is provided a Raman laser including: a pump power input unit for inputting Raman pumping energy into a first ring resonator; a first ring resonator receiving said Raman pumping energy and including a Raman gain medium for undergoing Raman lasing at a corresponding Stokes output power; the first ring resonator acting as laser feedback loop for the pump light energy and the Stokes output power and outputting a portion of the Stokes output power as the laser output; and wherein the Raman gain medium is formed from diamond having a reduced Raman spectrum.

BRIEF DESCRIPTION OF THE DRAWINGS

Embodiments of the invention will now be described, by way of example only, with reference to the accompanying drawings in which.

DETAILED DESCRIPTION

In the preferred embodiments, there is provided, a SLM resonantly-pumped ring diamond Raman laser (DRL). This provides a platform combining the low threshold of resonantly-pumped devices and the excellent power scaling prospects of external cavity DRLs. Furthermore, two techniques to achieve unidirectional Stokes oscillation are provided.

The embodiments provide an efficient and robust way to extend the wavelength reach of conventional SLM laser sources.

Figure 1:
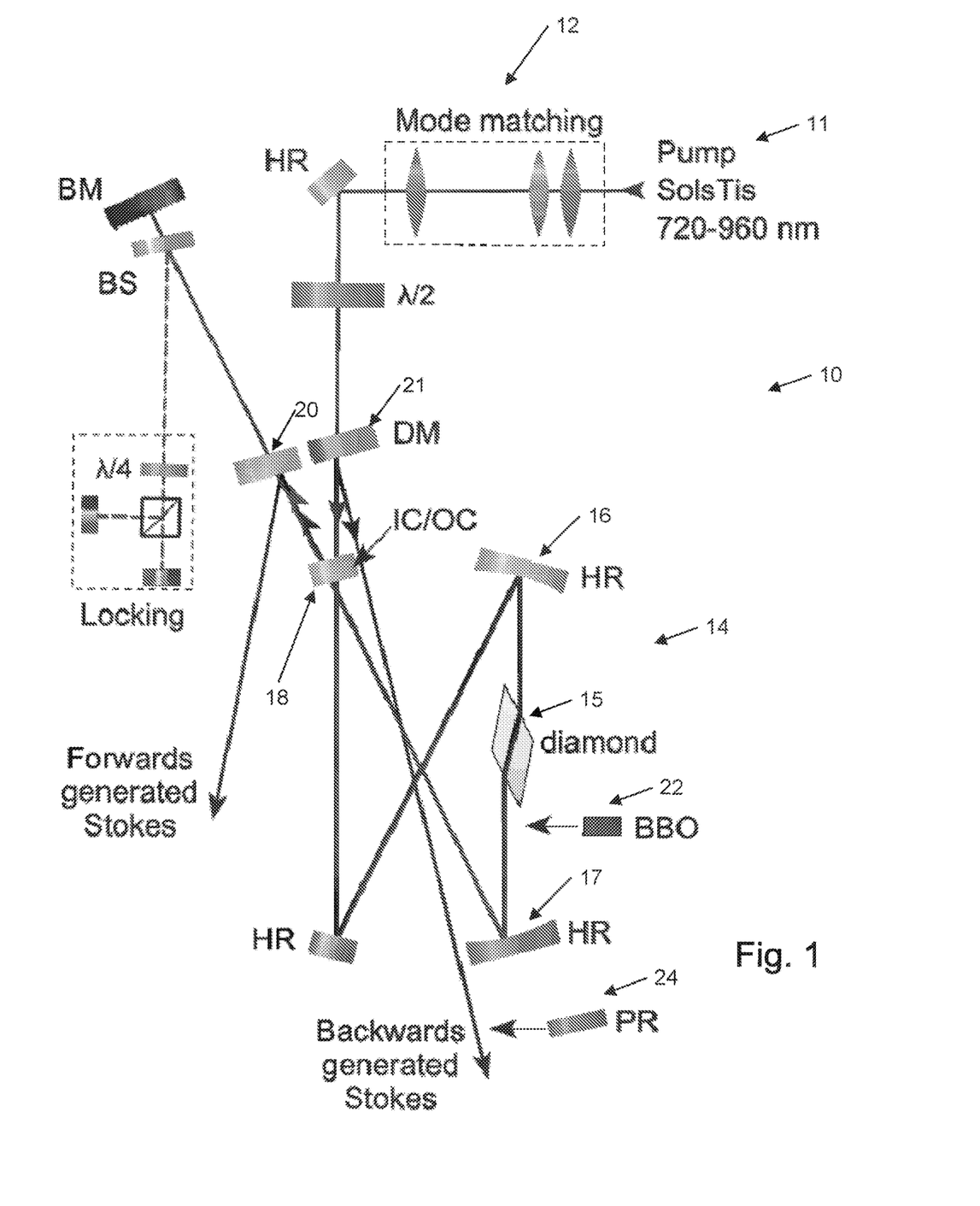
FIG. 1 illustrates a schematic layout of an embodiment.

Turning initially to FIG. 1, there is illustrated an embodiment 10. The encoding used can include: HR—High reflecting mirror, PR—Partial reflecting mirror, IC/OC—Input/Output coupler, 1% transmission @720-960 nm, DM—Dichroic mirror, HR @Stokes, HT@Pump, BS—Uncoated beam sampler, BM—Beam dump, λ/2—Half wave plate, λ/4—Quarter wave plate.

Initially a pump laser 11 pumps the system. The pump laser was a commercial SLM tunable (725-1050 nm) cw Ti:sapphire laser (SolsTiS, available from M Squared lasers Ltd) with maximum output power of 5 W at 790 nm. The pump was mode-matched 12 into a ring resonator 14 that was length locked to the wavelength of the pump laser using the Hansch-Couillaud method [22] to control a piezo-actuator controlling the position of one cavity mirror. The ring 14 comprised a bowtie cavity with two curved mirrors 16, 17 of radius 50 μm creating an elliptical waist in a diamond crystal 15 with radii 35 μm and 85 μm in vertical and horizontal directions respectively. A ring input coupler 18 was 1% transmissive in the range of 700-1080 nm and thus performed also as an output coupler for the generated Stokes radiation. All other mirrors were highly reflective for both pump and Stokes wavelengths. The Raman gain medium 15 was a CVD grown single crystal with dimensions of 5×2×5 mm³ (Element Six, low birefringence, low nitrogen sample), cut at the Brewster's angle for propagation along a [110] direction and polarization along a [111] direction to attain the highest gain [23].

Dichroic mirrors (DM) 20, 21 with high reflectivity at the Stokes wavelength and transmissive at the pump wavelength were used to prevent the Stokes output propagating back into the pump laser, and to separate the forward generated Stokes from the pump. To force unidirectional oscillation, either a partially reflective (PR) mirror (reflectivity R=87% at 700-1080 nm) 24 was inserted to retroreflect one of the output Stokes beams or a BBO crystal 22 was inserted near the diamond crystal.

Figure 2:
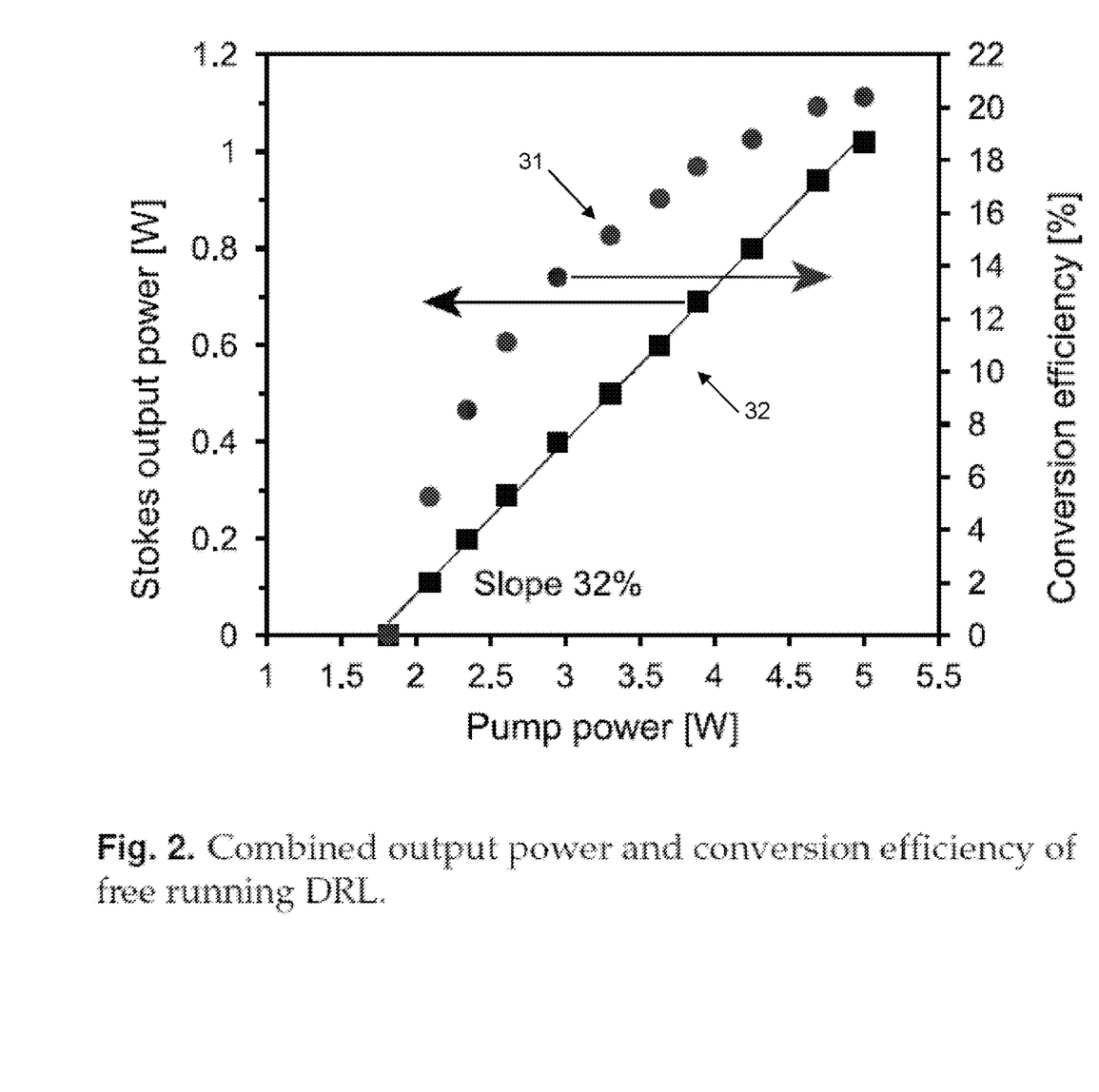
FIG. 2 illustrates a graph of the combined output power and conversion efficiency of free running DRL.

The laser was first characterised with no BBO 22 or retro-reflecting mirror 24. As shown in FIG. 2, for a 790 nm pump 11 the total 883 nm Stokes output power 32 of the free running frequency locked DRL increased with a linear slope of 33% up to 1 W for 5 W pumping at which point the conversion efficiency reached 22% 31.

The lasing threshold was 1.8 W of incident pump power. Similar output powers and efficiencies were obtained when pumped at other wavelengths accessible from the SolsTiS laser. There was normally significant output power in both the forward and backward directions.

Figure 3:
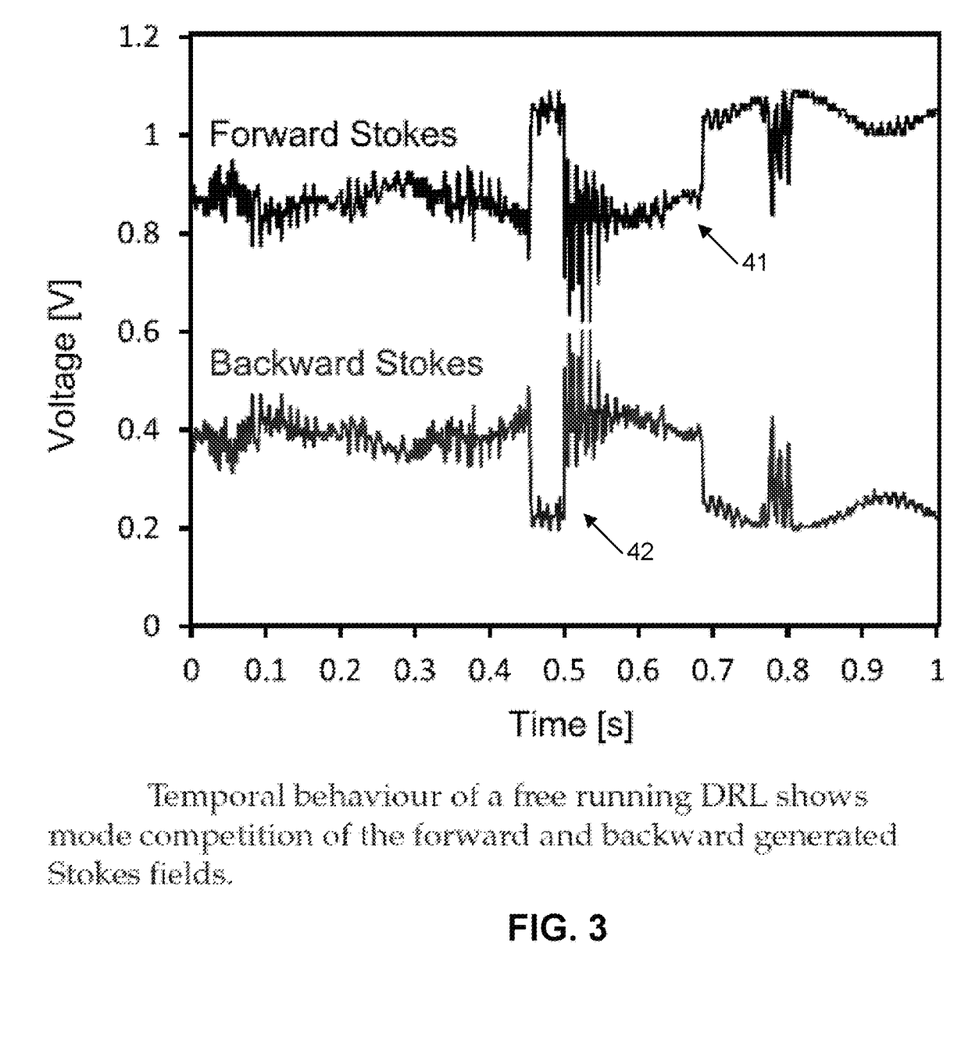
FIG. 3 illustrates a graph of the temporal behaviour of a free running DRL showing mode competition of the forward and backward generated Stokes fields.

FIG. 3 illustrates the noticeable competition between the forward and backward directions 41, 42, with the total output power fairly stable.

Figure 4:
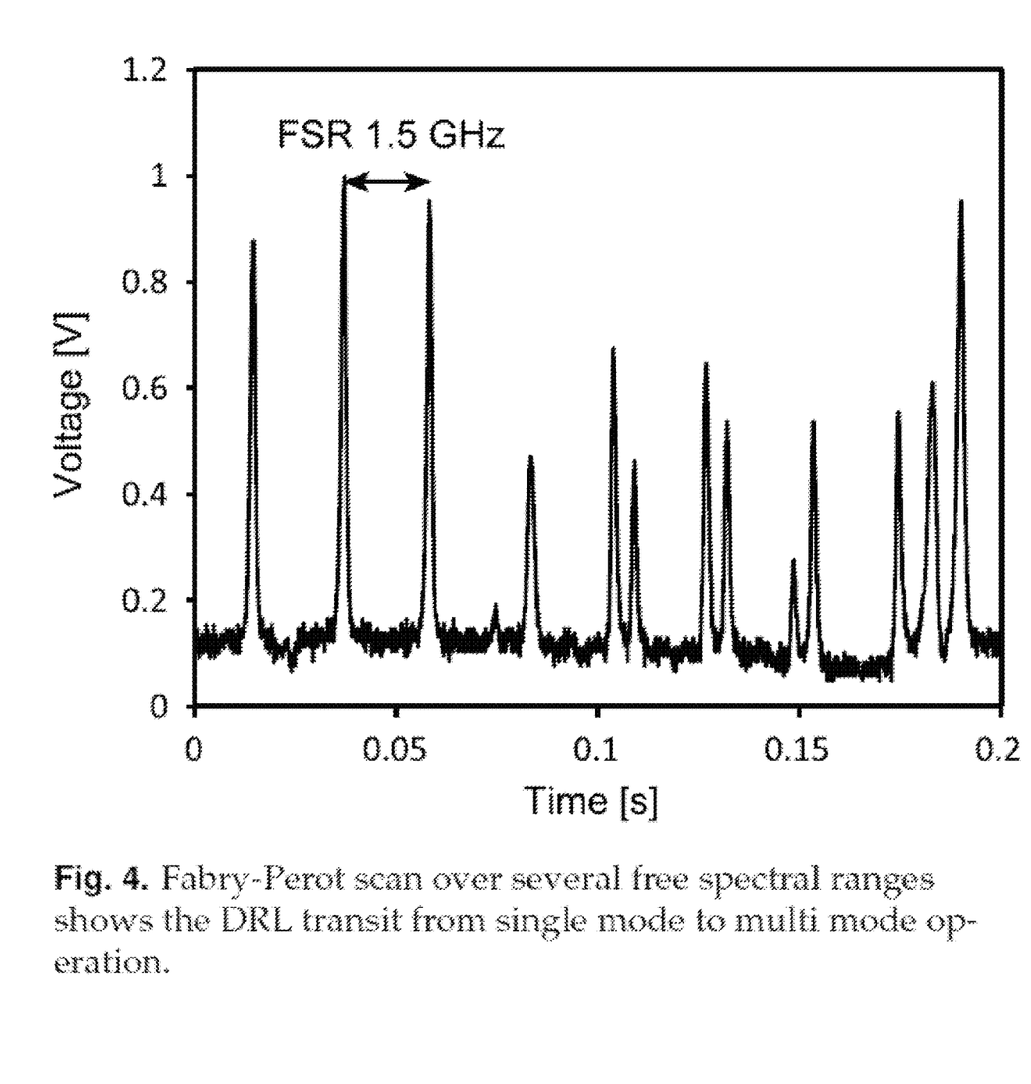
FIG. 4 illustrates a graph of a Fabry-Perot scan over several free spectral ranges showing the DRL transit from single mode to multi mode operation.

The distribution between forwards and backwards output was able to be shifted in favour of one direction by slight cavity adjustments. The Stokes spectrum often comprised just one longitudinal mode in each direction, verified by a Fabry-Perot interferometer (FPI) with FSR of 1.5 GHz. However, as shown in FIG. 4, instabilities due to mode competition caused occasional mode-hopping and multimode operation.

The overall performance of the doubly resonant DRL when free running was very stable. The fact that the generated power could divide in both directions corroborates the presumption of equality of forwards and backwards Raman gain in diamond.

To attain unidirectional operation, the symmetry can be broken by retro-reflecting the Stokes output from one direction back into the counter propagating field. This can include reinjecting the mode propagating backwards with respect to the pump field. The forward-generated mode is then amplified to the detriment of the backward oscillation that must contain just enough power to disrupt the balance of the gain. The retro-reflected field determines the phase of the forward scattered wave, similarly to inversion lasers [24].

A partially-reflecting retro-reflector (R=87%) 24 (FIG. 1) was inserted into the backward propagating beam. Virtually all generated power was now in the forward field, with the unidirectional output power shown in FIG. 5. The threshold was the same as for bidirectional operation, and at full pump power the backwards/forwards oscillating power ratio was measured to be around 4%. To investigate how much feedback was needed to obtain the unidirectionality, the PR was replaced by an uncoated beam sampler (BS). Although the BS provided only a 4% Fresnel reflection, the power ratio increased only to about 6%. This retrorefecting element could be any element that retroreflects a portion of the beam, including frequency selective retroreflectors such as volume bragg gratings.

A second method of achieving unidirectionality was to introduce a direction-dependent loss, usually in a form of a non-reciprocal optical isolator [25]. The common Faraday optical isolators are somewhat lossy and also wavelength-sensitive, and therefore not ideal for high-finesse cavities that resonate two wavelengths. Another approach is to exploit parametric loss due to sum frequency mixing (SFM) of a unidirectional pump beam with the bidirectional generated field. The SFM introduces loss to the field co-propagating with the pump and not to the counter propagating field. Thus, the ring laser may run purely in counter propagating direction. In contrast to [26], where a single-pass pump beam interacted with a resonated fundamental field, in our example, there is a unidirectional resonated pump beam which frequency-mixes with the bidirectional Stokes field. The resonated pump beam results in a much stronger and more practical effect.

Figure 5:
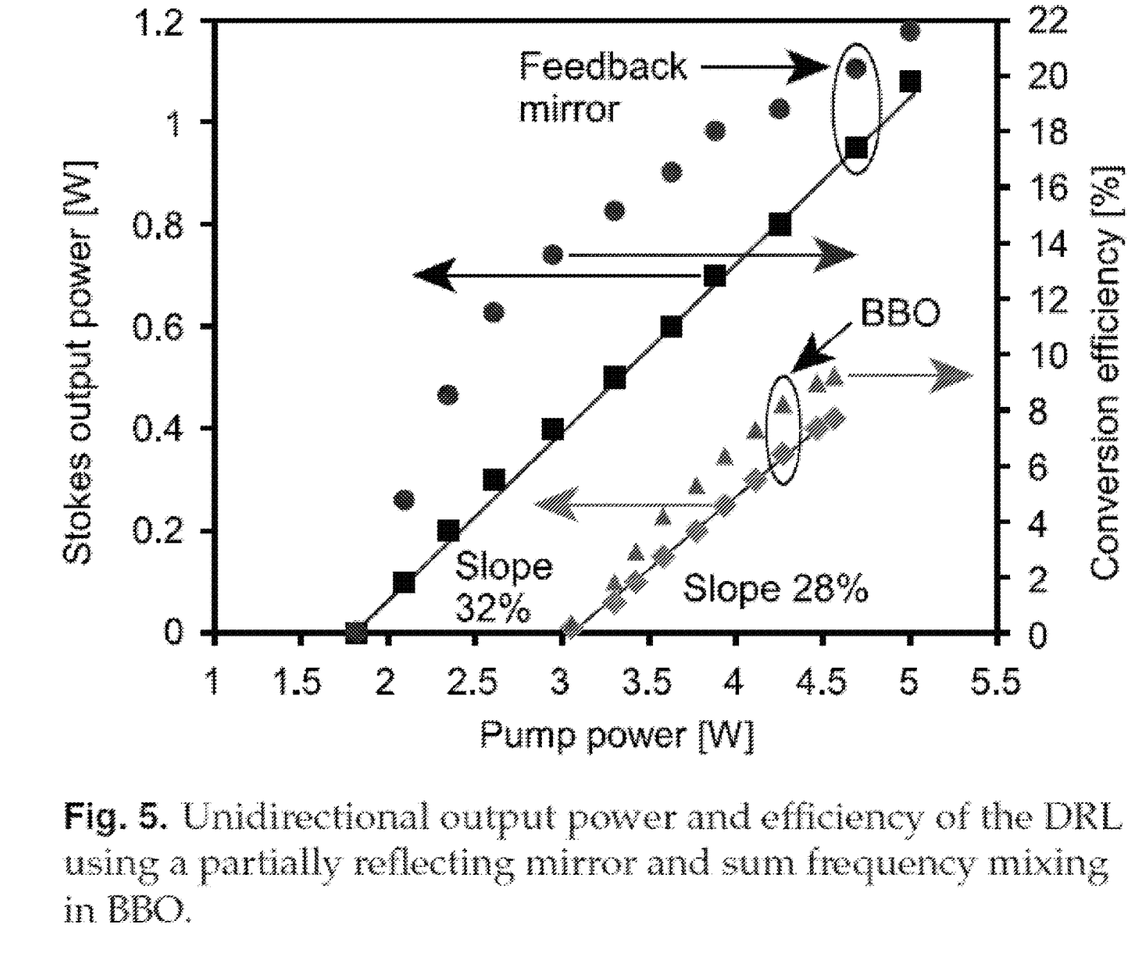
FIG. 5 illustrates the unidirectional output power and efficiency of the DRL using a partially reflecting mirror and sum frequency mixing in BBO.

A BBO crystal 22 was inserted after the diamond (see FIG. 1) to introduce SFM of the pump and forward generated Stokes wave. The BBO was AR coated at 930-1062 nm, 4×4×3 mm³ in size and cut at θ=24° for phase matching of sum frequency mixing. Due to the SFM-introduced loss the forward-generated Stokes was almost entirely extinguished, with the forwards/backwards oscillating power ratio estimated to be below 0.5%. The output power for this arrangement was lower and is shown in FIG. 5. The additional passive loss owing to scattering and residual reflections from the BBO reduced the useful Stokes output and also inhibited the enhancement of the pump. Therefore, the lasing threshold increased to 3 W and the slope efficiency decreased to 28%. The maximum backward generated output power reached 0.45 W. A Brewster-cut BBO crystal may decrease the parasitic loss compared to the current AR-coated crystal.

Figure 6:
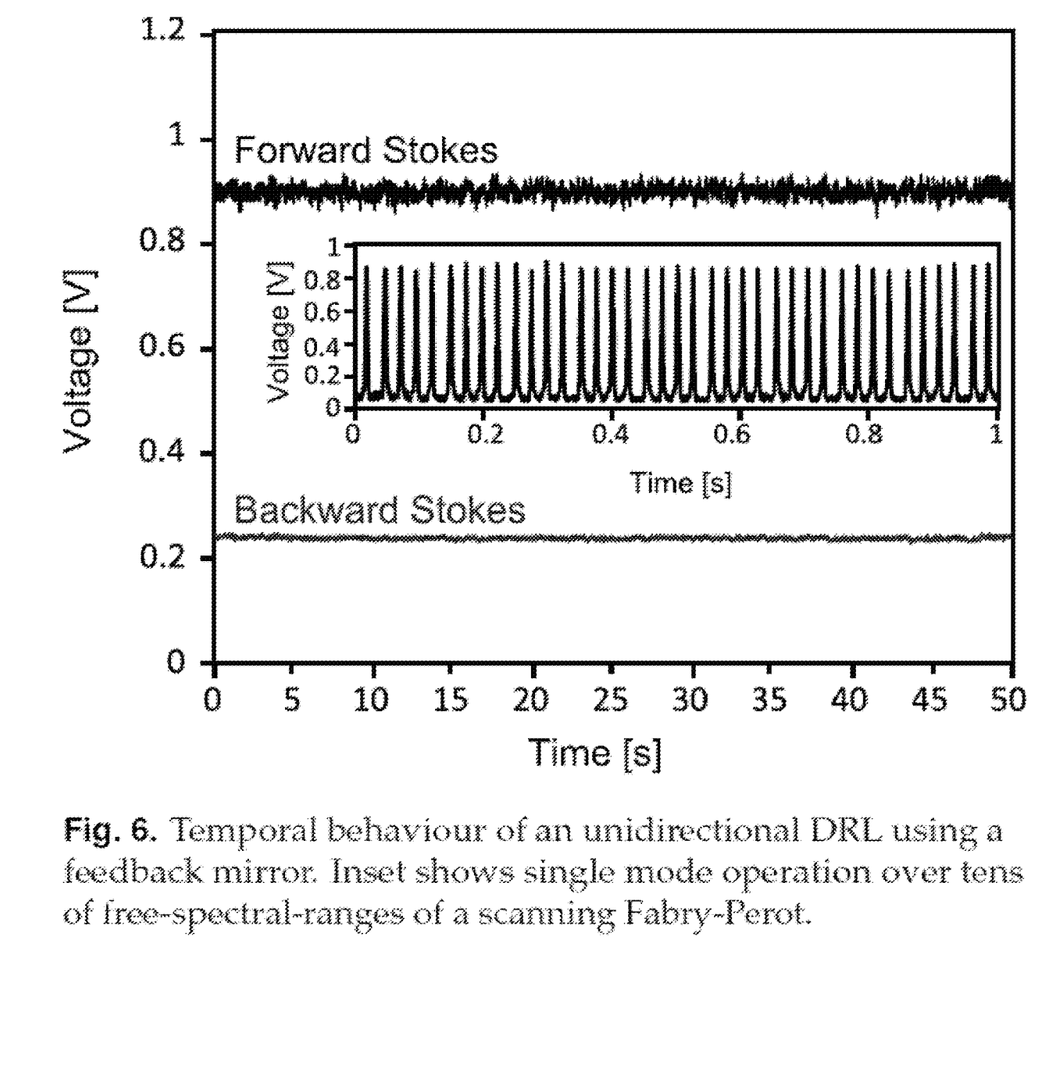
FIG. 6 illustrates the temporal behaviour of an unidirectional DRL using a feedback mirror. The Inset shows single mode operation over tens of free-spectral-ranges of a scanning Fabry-Perot.

For both unidirectional lasers stable single mode operation was achieved as shown in FIG. 6. Although the Raman gain in the diamond was very broad (30 GHz) compared to the longitudinal mode spacing of the ring resonator (1.1 GHz) only a single longitudinal mode oscillated in the cavity (see inset of FIG. 6). This is in contrast to standing wave cavities without active stabilization which have been investigated previously [17]. It is thought that the active feedback of the cavity length plays an important role in keeping the intra-cavity mode isolated from external vibrations and thermal effects in the crystal [17] which may lead to multi-mode operation.

The reinjection method of achieving unidirectional operation of ring lasers is recommended against in the literature for use in SLM inversion lasers. The unavoidable residual bidirectional operation in this method can cause spatial hole burning that can prevent stable single mode operation [25]. Instead the use of optical isolators is provided in SLM inversion lasers, despite the additional loss and complexity that they introduce. Since stimulated Raman scattering is a phonon-photon interaction with no energy storage in the active medium, spatial hole burning is absent in Raman lasers, allowing the simpler reinjection method to be successfully be used in this case.

In conclusion, a single-longitudinal-mode ring DRL generating 1 W of Stokes output power with 33% slope and 22% conversion efficiency was constructed. Two methods of unidirectional generation in the ring DRL have been provided. Implementing a parametric loss for one direction by phase-matched nonlinear conversion and providing a seed for one direction by reflecting the other back into the resonator. Both techniques result in a stable unidirectional SLM output. With the retro reflective mirror, the power ratio in the suppressed and amplified direction was about 5%. Using a parametric loss, on the other hand, decreased the ratio below 0.5%; however, the insertion loss associated with the BBO negatively impacted the output power and efficiency.

The presented SLM DRL design has the capability to extend the wavelength range of the pump Ti:sapphire laser from its current maximum of 1.050 μm out to 1.220 μm. This extension could be further increased beyond 1.45 μm by cascading the Raman process within the same cavity. In principle, this concept can be combined with resonant frequency doubling to generate any wavelength between 200 nm and 1450 nm.

Resonant Raman Conversion

Without wishing to be bound by theory, a detailed theoretical analysis of the resonant Raman conversion was carried out.

For a ring enhancement cavity with an input mirror reflectivity R and a round trip gain G at the pump wavelength (which can be less than one for a loss), the intracavity resonant enhancement factor of the incident power as given in [25], as:

$$\alpha = \left\{ \frac{(1-R)^{0.5}}{1-R^{0.5}G^{0.5}} \right\}^2 \quad (1)$$

The fraction of the incident beam rejected from the cavity is $$\beta = \left\{ \frac{R^{0.5} - G^{0.5}}{1-R^{0.5}G^{0.5}} \right\}^2$$

There is no rejected beam for R=G. This implies when cavity losses are equal to input mirror transmission; there is impedance matching.

Considering a cavity with a mode area A, Raman gain g, crystal length l, Raman quantum efficiency η, and passive cavity losses L, the incident pump power is $P_{Fout}$, and so the intracavity pump power is $P_{Fin}=\alpha P_{Fout}$. In steady state, the Stokes gain must be equal to the Stokes loss, so:

$$(1-R) + L = \frac{gP_{Fin}l}{A} = \frac{g\alpha P_{Fout}l}{A}$$

or if the confocal parameter b does not satisfy b>>1 [27]:

$$(1-R) + L = g\alpha P_{Fout} \frac{4\tan^{-1}\frac{l}{b}}{\lambda_p + \lambda_s}$$

Assuming b>>1, this can be rearranged to get:

$$\alpha = \frac{(1-R+L)A}{glP_{Fout}} \quad (2)$$

The is also a derivation of α from R and G from above. The fundamental gain G can be rewritten as "1−passive loss−Raman loss":

$$G = 1 - L - \frac{gP_{Sin}l}{A\eta} \quad (3)$$

where $P_{Sin}$ is the intracavity Stokes power, related to the output Stokes power by $$P_{Sout} = (1-R)P_{Sin} \quad (4)$$

This Stokes power can be split arbitrarily between the two directions in the ring without changing the equations, and hence the arbitrary unidirectional operation of this simple ring geometry can be predicted.

Figure 7:
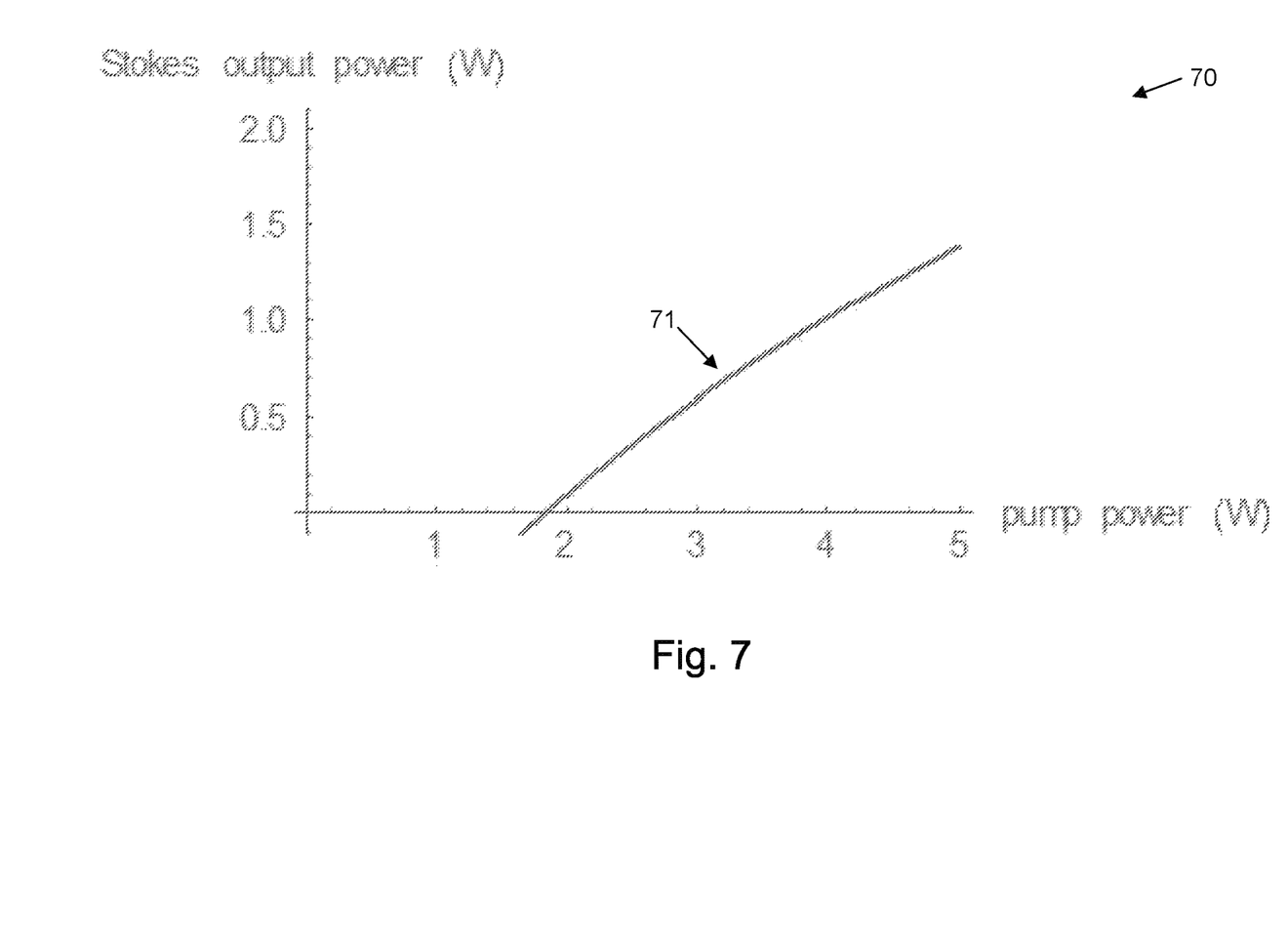
FIG. 7 shows 70 a graph of the predicted Stokes output vs Pump input power of an embodiment.

Equating (1) and (2), and substituting in (3) and (4), one obtains the steady-state Stokes output power $P_{Sout}$ as a function of pump input power $P_{Fout}$. The analytic solution can be simulated. For an 800 nm pump wavelength shifting to 900 nm, using an 5 mm Brewster-cut diamond, a 35 micron spot (stretched by a factor of the refractive index n in the tangential plane), 0.75% passive losses, and 1% input and output mirror transmission, FIG. 7 shows 70 a graph of the predicted Stokes output vs Pump input curve:

As with a non-enhanced lasers, there is a trade off between low threshold and high slope efficiency. The transfer characteristic 71 is notably curved, unlike a non-enhanced laser. This graphs shows reasonable agreement with the threshold of the experimental demonstration, with the experimental maximum output power a little lower.

Discussion and Alternative Embodiments

The effective utilisation of using a simple retro-reflecting mirror to get stable SLM operation is surprising. While retro-reflecting mirrors are commonly used to get unidirectional output from multimode lasers [28], it is known that this method is not suited to achieving SLM operation. This is due to the fact that the method does not achieve pure unidirectional operation, and in conventional lasers, the residual beating between the counter-propagating fields leads to spatial hole burning, which in turn prevents SLM operation [25]. The unexpected success in the case of the ring Raman laser is thought to be from the absence of spatial hole burning in Raman lasers. This permits stable SLM operation using the retro-reflecting mirror despite not achieving pure unidirectional operation [16].

Using intracavity sum-frequency mixing as an alternative method of achieving unidirectional operation was also found to achieve much purer unidirectional operation. This can be advantageous for increased stability of operation. The use of SFM for making unidirectional lasers has been demonstrated before using an auxiliary laser [26]. In the present case, by using the resonated fundamental field to mix with the first Stokes field, a much stronger effect has been achieved, so requiring a much thinner SFM crystal. The SFM can also be used in a cascaded Raman laser, with the mixing of adjacent Stokes orders ensuring that each new Stokes field counter-propagates with respect to its source Stokes field.

SFM can also be used inside the cavity of a non-resonantly pumped ring Raman lasers. SFM of the non-resonated pump with the resonated Stokes field can ensure a unidirectional operation of the Stokes laser.

The control of thermal effects are also important in the embodiment for two reasons. Firstly, thermal lensing and aberration in the Raman media introduce cavity losses for the Stokes and fundamental fields, and can inhibit the performance of the laser. Thermal effects are identified as a key limiting factor in resonantly-pumped gas lasers [20], [29], [30].

Secondly, thermal changes in the Raman medium can alter the optical path length through the medium, and this can affect the locking of the cavity. In the utilisation of KGW, it was found difficult to achieve and maintain a stable locked cavity. This was thought due to the thermal effects. The use of diamond was thought to substantially alleviate both of the thermal issues—it allows effective power scaling of the laser up to the Watt level and beyond, and also avoids deleterious thermal degradation of the stability of the cavity locking.

Diamond also advantageously has a very simple Raman spectrum, with no smaller Raman shifts. This is particularly important in resonantly-pumped Raman lasers. Since the optical cavity has a high Q at both the pump wavelength and the desired Stokes wavelength, if the Raman material has any small Raman shifts, then these can generate undesired light close to the pump wavelength. This can be avoided in non-resonant Raman lasers by ensuring that the cavity Q is sufficiently low close to the pump wavelength. This technique is not available for resonantly-pumped lasers. In examples using KGW in a resonantly-pumped system, it was found that often the laser did not produce any output at our target wavelength (associated with the 901 cm$^{-1}$ Raman shift), instead generating light close to the pump wavelength due to one of the small shifts of KGW. The use of diamond, which has no competing small shifts, ensures that all optical power is channelled into the desired wavelengths.

Where the retroreflecting mirror is utilised, a spectral filter can also be introduced. By spectrally filtering the optical field fed back into the cavity, it is possible to control the spectrum of the intracavity Stokes field. This can assist in narrowing or tuning the spectrum of that field. The spectral filter may comprise tuning elements such as etalons, birefringent filters, transmission gratings, or prisms. Filtering may also be achieved directly by the retroreflecting element, for example, by using a reflection grating or volume-Bragg-grating.

Intracavity doubling of a Stokes field, may need an additional nonlinear crystal, and a dichroic mirror to outcouple the doubled radiation. It may be possible to use a single nonlinear crystal to simultaneously achieve unidirectional operation (using phase-mismatched sum-frequency mixing of the pump and Stokes fields) and intracavity doubling of the desired Stokes field (through phase-matched frequency doubling).

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A single longitudinal mode ring Raman laser including:
   a pump source outputting a pump light power, mode matched and resonantly coupled to a ring resonator;
   the ring resonator including a Raman gain medium;
   wherein the Raman gain medium receives the pump light power and undergoes Raman lasing generating Stokes power at a corresponding Stokes wavelength;
   the ring resonator acting as laser feedback loop for the pump light power and the Stokes power and outputting a portion of the Stokes power as the laser output; and
   a unidirectional isolator for causing the Stokes output power to propagate in one direction within the ring resonator;
   wherein the unidirectional isolator includes a partially reflective element, or an element with second order nonlinearity to provide sum frequency mixing of the pump light power with the Stokes power to force unidirectional backwards Stokes oscillation with respect to the pump light power.

2. A Raman laser as claimed in claim 1 wherein said ring resonator comprises a Bow-tie cavity having a series of curved mirrors focusing the pump light power into an elliptical or circular cross section within the Raman lasing medium.

3. A Raman laser as claimed in claim 1 wherein said Raman gain medium comprises a low birefringence, low nitrogen grown diamond crystal.

4. A Raman laser as claimed in claim 3 wherein said diamond crystal is cut at a Brewsters angle for propagation of light along a [110] direction and polarization along an orthogonal [111] axis.

5. A Raman laser as claimed in claim 1 further including a series of dichroic mirrors having high selectivity at the Stokes wavelength to isolate the Stokes output power from the pump source.

6. A Raman laser as claimed in claim 1 wherein the partially reflective element comprises a retro-reflective mirror.

7. A Raman laser as claimed in claim 1 wherein said unidirectional isolator is formed as a result of parametric loss due to sum frequency mixing of the pump light power with the bidirectional generated field.

8. A Raman laser as claimed in claim 7 where the sum frequency mixing is provided by a BBO crystal.

* * * * *